United States Patent
Engel

(12) 
(10) Patent No.: US 6,207,895 B1
(45) Date of Patent: Mar. 27, 2001

(54) DEVICE BOX FOR WALL MOUNTED COMMUNICATIONS APPARATUS

(75) Inventor: Mark Anthony Engel, Woodridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/275,616

(22) Filed: Mar. 24, 1999

(51) Int. Cl.[7] .................................................. H01H 9/02
(52) U.S. Cl. .......................... 174/53; 220/3.94; 439/535
(58) Field of Search .................................. 174/53, 54, 58, 174/50, 48; 439/535, 536; 220/3.2, 3.8, 4.02, 3.92, 3.94

(56) References Cited

U.S. PATENT DOCUMENTS

| | | | |
|---|---|---|---|
| 2,028,509 | * | 1/1936 | Knell ..................................... 220/3.94 |
| 5,114,365 | * | 5/1992 | Thompson et al. ................... 439/540 |
| 5,230,552 | * | 7/1993 | Schipper et al. .................. 312/223.6 |
| 5,486,650 | * | 1/1996 | Yetter ...................................... 174/53 |
| 5,491,902 | * | 2/1996 | Uhrin et al. ............................ 33/563 |
| 5,574,256 | * | 11/1996 | Cottone .................................. 174/53 |
| 5,594,207 | * | 1/1997 | Fabian et al. .......................... 174/58 |
| 5,621,788 | * | 4/1997 | Eiken .................................... 379/147 |
| 5,659,650 | * | 8/1997 | Arnett ................................... 385/135 |
| 5,934,917 | * | 8/1999 | Haut ..................................... 439/131 |
| 6,051,785 | * | 4/2000 | Baldwin et al. ........................ 174/54 |

\* cited by examiner

*Primary Examiner*—Kristine Kincaid
*Assistant Examiner*—Dhiru R Patel
(74) *Attorney, Agent, or Firm*—Duft, Graziano & Forest, PC

(57) ABSTRACT

The device box for wall mounted communication equipment functions to provide connections for communications conductors and electrical conductors as well as a housing to receive a power transformer, with the installation of the device box for wall mounted communication equipment capable of being mounted flush with a wall surface. The device box for wall mounted communication equipment includes a box of sufficient size to receive: electrical conductors, which are terminated on an electrical outlet contained within the box; communications conductors which are terminated on a telephone jack; space to receive a transformer to interconnect the wireless telephone station set with the electrical outlet; and features that serve to mount the wireless telephone station set to the device box for wall mounted communication equipment. An optional cover plate can be provided in one embodiment of the device box for wall mounted communication equipment to enclose the transformer when it is installed in the electrical outlet contained within the device box for wall mounted communication equipment.

7 Claims, 3 Drawing Sheets

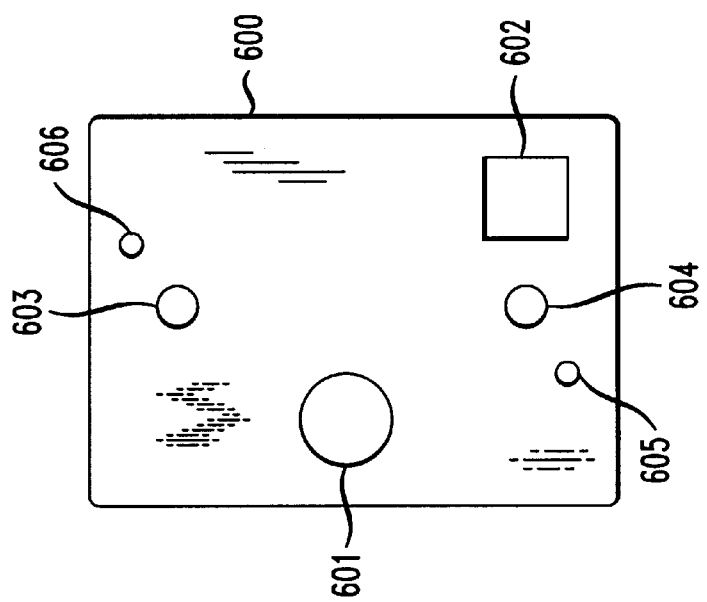
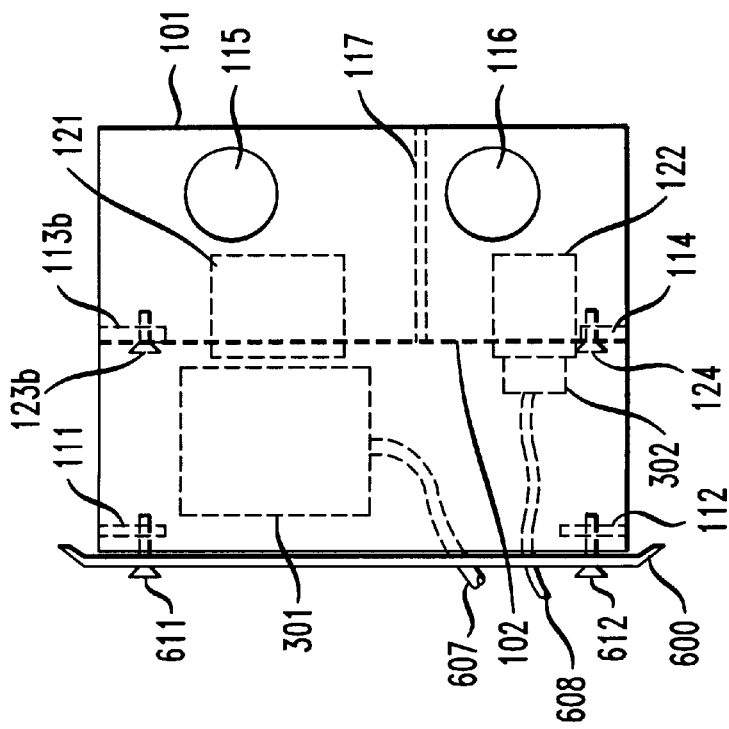

DEVICE BOX FOR WALL MOUNTED COMMUNICATIONS APPARATUS

FIELD OF THE INVENTION

This invention relates to wall mounted communications apparatus that require connection to both communication conductors and general conductors that are connected to a source of line current, such as a typical branch circuit having overload protection.

PROBLEM

It is a problem in the field of wall mounted communications equipment to provide connections to both communications conductors and electrical conductors in an efficient manner as well as providing subscriber mobility within a reasonable proximity to the wall mounted wireless telephone station set. A typical wall mounted communications equipment is a wall mounted wireless telephone station set, which requires connections to the telephone line as well as to an electrical outlet.

The wall mounted wireless telephone station set eliminates the need for a long telephone cord which tethers the subscriber to the wall mounted wireless telephone station set. The need for subscriber mobility in many environments, such as: kitchen, shop area, garage, retail location, and the like, has traditionally resulted in the use of a long telephone cord to enable the subscriber to move a distance away from the wall mounted wireless telephone station set without interrupting the telephone conversation. However, a disadvantage of the long telephone cord is that it tends to become tangled in surrounding furniture and interferes with the movement of others around the subscriber without becoming tangled in the telephone cord. Furthermore, the long telephone cord has a propensity to become twisted and knotted over time, requiring the subscriber to disconnect the telephone cord from the wall mounted wireless telephone station set to straighten the telephone cord to its original orientation, if possible.

However, while the wireless telephone station set eliminates the need for a long telephone cord, the typical installation of a wall mounted wireless telephone station set requires connections to both the telephone line as well as to an electrical outlet. This requirement entails the use of a standard electrical box mounted in the wall approximately 1.5–2.0 meters above the floor, which standard electrical box serves to provide fixtures for mounting the telephone station set to the wall as well as providing access to the telephone line. Unfortunately, the electrical connection for the wall mounted telephone station set consists of a transformer that is designed to plug directly into an electrical outlet. The transformer is therefore plugged into the nearest electrical outlet, typically located approximately ⅓ meter above the floor, and the conductor carrying cable from the transformer is run along the wall to the wall mounted wireless telephone station set where the plug which terminates the cable is plugged into a jack on the wall mounted wireless telephone station set. While this installation is operable to provide the wall mounted wireless telephone station set with access to both communications conductors and electrical conductors, the transformer occupies an available electrical outlet and prevents its use for other appliances, while also resulting in the cable being draped along the wall, where it can be snagged and the transformer accidently pulled loose or the cable damaged.

Thus, the wall mounted wireless telephone station set is a great advantage for use in many applications, such as a kitchen or workshop, where long telephone cords are problematic, but suffers from the lack of some mechanism to provide connections to both communications conductors and electrical conductors in an efficient manner.

SOLUTION

The above described problems are solved and a technical advance achieved by the present device box for wall mounted communication equipment which functions to provide connections for communications conductors and electrical conductors as well as a housing to receive a power transformer, with the installation of the device box for wall mounted communication equipment capable of being mounted flush with a wall surface. The device box for wall mounted communication equipment comprises a box of sufficient size to receive: electrical conductors, which are terminated on an electrical outlet contained within the box; communications conductors which are terminated on a telephone jack; space to receive a transformer to interconnect the wireless telephone station set with the electrical outlet; and features that serve to mount the wireless telephone station set to the device box for wall mounted communication equipment. An optional cover plate can be provided in one embodiment of the device box for wall mounted communication equipment to enclose the transformer when it is installed in the electrical outlet contained within the device box for wall mounted communication equipment.

The dimensions of the present device box for wall mounted communication equipment can be selected to conform to a number of configurations, with one limiting factor being the need to enclose the transformer for the wall mounted wireless telephone station set, and a second limiting factor being the space required within the device box for wall mounted communication equipment to install the necessary electrical conductors, electrical outlet and communication conductors in a manner to comply with typical electrical building codes that are promulgated by the appropriate regulatory agencies.

BRIEF DESCRIPTION OF THE DRAWING

FIG. 5 illustrates a top plan view of an alternate embodiment of the present device box for wall mounted communication equipment; and FIG. 6 illustrates a top plan view of a cover plate that can be used with the alternate embodiment of the present device box for wall mounted communication equipment.

DETAILED DESCRIPTION

A typical wall mounted communications equipment is a wall mounted wireless telephone station set, which requires connections to the telephone line as well as to an electrical outlet. The electrical connection for the wall mounted telephone station set consists of a transformer that is designed to plug directly into an electrical outlet, with the transformer being equipped with a conductor carrying cable that is terminated in a plug which mates with a jack that is mounted on the wall mounted wireless telephone station set. The transformer-conductor cable apparatus supplies the wall mounted wireless telephone station set with sufficient power to implement the features programmed into the wall mounted wireless telephone station set, with the wireless communication capability being a primary consumer of the provided electrical power. While the wall mounted wireless telephone station set has been selected as an example of the wall mounted communications apparatus, it is not intended to limit the use of the present device box for wall mounted communication equipment to such a communication device, since there are numerous other applications possible for the present device box for wall mounted communication equipment, including: intercom, radio/entertainment equipment, security systems, and the like.

Definitions

Branch Circuit—The circuit conductors that are installed between the final over current device that protects the electrical circuit and the outlet(s).

Outlet—A point in the wiring system at which current is taken to supply utilization equipment.

Receptacle—A receptacle is a contact device that is installed at the outlet for the connection of a single contact device. A single receptacle is a single contact device with no other contact device on the same yoke.

Utilization Equipment—Equipment that utilizes electric energy for electronic, electromechanical, chemical, heating, lighting, or similar purposes.

Conductor Fill—Conductor fill is the number of electrical conductors that can enter a box, as delimited by standard conductor fill tables. Each conductor that originates outside of a box and terminates or is spliced within the box shall be counted once in determining conductor fill in a box. The conductor fill in a box is determined by the gauge of the electrical conductors, the number of electrical conductors in the box, as well as the space in the box occupied by other apparatus.

Architecture of the Device Box for Wall Mounted Communication Equipment

Figure 2:
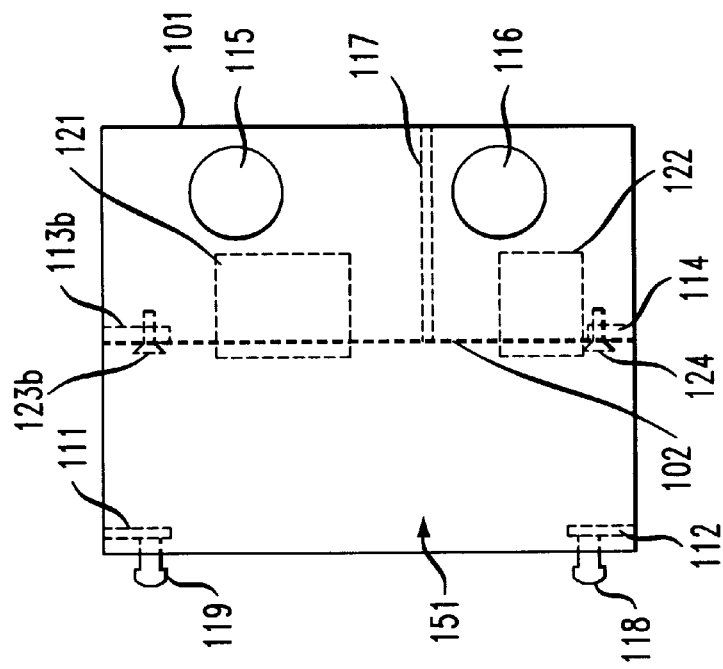
FIG. 2 illustrates a side plan view of the present device box for wall mounted communication equipment.
Figure 1:
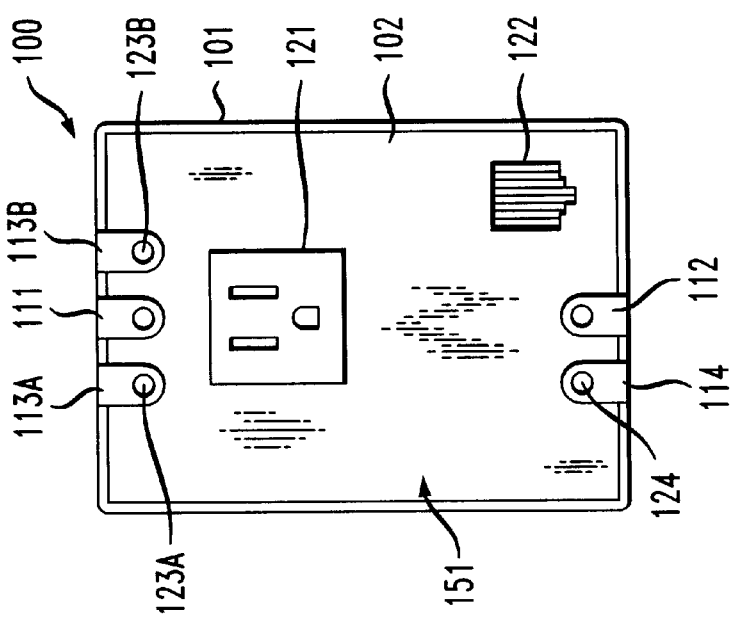
FIG. 1 illustrates a top plan view of the present device box for wall mounted communication equipment.

FIG. 1 illustrates a top plan view, while FIG. 2 illustrates a side plan view of the present device box for wall mounted communication equipment. The device box for wall mounted communication equipment is shown as a rectangular shaped box, although the space is not a limiting factor, with round, octagonal, or other shaped boxes being a possibility. The rectangular box is probably the most common shape of electrical box in use and this configuration is therefore used in this description. In addition, the box can be formed of metal or non-conducting material as is well known in the field, with the metal box application being illustrated herein.

The device box for wall mounted communication equipment 100 comprises a box 101 having an open side 151 therein and which comprises a metal box 101 of metallic composition, with an electrical outlet carrying plate 102 being mounted therein. The box 101 includes an optional barrier strip 117 that divides the interior of box 101 below the outlet carrying plate 102 into two compartments, one for the electrical conductors and one for the communication conductors. The outlet carrying plate 102 comprises a substantially flat plate formed of suitable material, such as rigid non-conductive material or metal, which has a single electrical outlet 121 mounted therein, as well as a telephone jack 122. The box 101 includes mounting tabs 114 and 113A or 113B which are used to secure the outlet carrying plate 102 in place within the box at a predetermined position within the box 101 and to enable the outlet carrying plate 102 to be secured by the use of fasteners 124, 123 which are threaded through holes formed in the outlet carrying plate 102 into the tabs 114, 113A or 113B. The tabs 113A and 113B are shown to indicate the two possible positions that can be selected to mount the tabs. In particular, the offset tab combination 114, 113B serves to provide some increased stability over the combination of tabs 114, 113A, which are offset from the centerline on the box 101. The need to be concerned with the placement of the tabs 114, 113A or 113B is due to the fact that tabs 111, 112 are present on the top of box 101 to present a mounting pins 118, 119 located juxtaposed to said open side 151 and projecting outward from the interior space of said box through said open side 151 to which the wall mounted telephone station set is affixed. Since these mounting pins 118, 119 are centered along the top and bottom sides of the box 101, access to the lower tabs 114,113A or 113B is limited if the lower tabs 114, 113A or 113B are placed directly below the upper tabs 111, 112. In addition, for the outlet carrying plate 102 to be placed within the box 101, the outlet carrying plate 102 must clear upper tabs 111, 112 which project into the aperture of box 101. Thus, offsetting the lower tabs 114, 113A or 113B may be advisable to provide additional room for the insertion of the outlet carrying plate 102 into box 101.

The location, size and orientation of the tabs 114, 113A or 113B, 111, 112 can be varied as a function of the dimensions of the box 101. In fact, one of these sets of tabs can be placed along the other two sides (right and left sides shown in FIG. 1) as a further option, wherein the outlet carrying plate 102 can have apertures formed in the locations where it must clear the upper tabs 111, 112, so that the outlet carrying plate 102 can simply be inserted into box 101 without having to angle the outlet carrying plate to clear the upper tabs 111, 112. In addition, the box 101 can have formed in the sides and back thereof "knock-outs", such as 115, 116 shown in FIG. 2, to enable the use of rigid metallic or non-metallic conduit or flexible metallic conduit.

In addition, the device box for wall mounted communication equipment 100 is typically provided with a mechanism to enable the mounting of the device box for wall mounted communication equipment 100 to a framing member or wall support. For example, the flanges 141, 142 are illustrated as nailing members that are affixed to the outside of box 101 and project outwardly from box 101 and parallel to the one side thereof to provide a "nailing member" through which an appropriate fastener (not shown) can be placed to secure the device box for wall mounted communication equipment 100 to a framing member (not shown) as is well known in this field. Alternatively, small "knock-out" holes (not shown) can be formed in the back or sides of the device box for wall mounted communication equipment 100 as is also well-known in the filed. Regardless of the fastening method selected, the basic architecture of the device box for wall mounted communication equipment 100 is compatible with the selected fastening method.

Communications Conductors

Communications conductors are typically not permitted to be placed in any enclosure, such as: raceway, compartment, outlet box, junction box, or similar fitting, with conductors of electric light or power circuits, except where all of the conductors of electric light or power circuits are separated from all of the conductors of communications circuits by a barrier located within the enclosure. One further exception is where conductors of the electric light or power circuits are introduced to the enclosure solely for supplying power to communications equipment that are served by the communication conductors. In this case, the electric light or power conductors must be routed within the enclosure to maintain a minimum of 6.35 mm (0.25 in.) separation from the communications conductors.

Thus, the barrier 117 shown in FIG. 2 is provided to maintain the separation between the conductors of the power circuit and the communications conductors. This barrier eliminates the possibility that the alternative required minimum spacing between the conductors of the power circuit and the communications conductors can be inadvertently violated. The location of barrier 117 within box 101 is a function of the size of box 101 as well as the positioning of the outlet carrying plate 102 and the size of the conductors used in the box. Thus, the volume of space located under the outlet carrying plate 102 on the electrical conductor side of barrier 117 must comply with the requirements of conductor fill noted below. In addition, the volume of space located under the outlet carrying plate 102 on the communication conductor side of barrier 117 must provide sufficient space to interconnect the communication conductors which enter box 101 and connect to the telephone jack 122.

Transformer and Phone Line Connections

Figure 4:
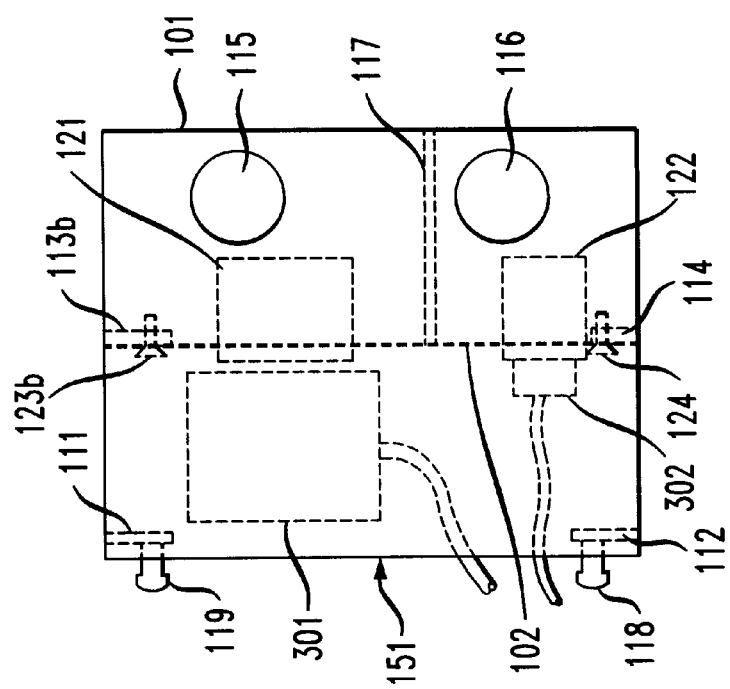
FIG. 4 illustrates a side plan view of the present device box for wall mounted communication equipment with a transformer mounted therein as well as a telephone cord.
Figure 3:
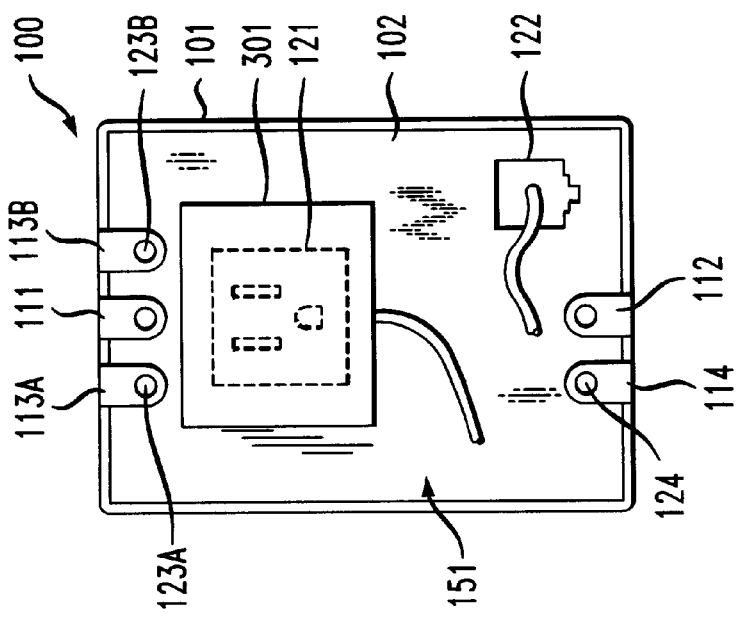
FIG. 3 illustrates a top plan view of the present device box for wall mounted communication equipment with a transformer mounted therein as well as a telephone cord.

FIG. 3 illustrates a top plan view, while FIG. 4 illustrates a side plan view of the present device box for wall mounted communication equipment with a transformer mounted therein as well as a telephone cord. These views are a replication of those of FIGS. 1 and 2, respectively with the addition of a typical size power transformer 301 and a telephone line 302 plugged into power outlet 121 and telephone jack 122, respectively. As can be seen from FIGS. 3 and 4, the box 101 is shown as being of sufficient depth to receive the entirety of transformer 301.

Conductor Fill

The dimensions of box 101 are in part determined by the necessary conductor fill of box 101. In particular, the space located above the outlet carrying plate 102 must accommodate the transformer 301 shown in FIGS. 3 and 4. The volume of space located under the outlet carrying plate 102 on the electrical conductor side of barrier 117 can be calculated using the charts of Table A and Table B, which are typical requirements for conductor fill presently in use as defined in the National Electrical Code. Table A notes the number of conductors of a particular gauge that can be placed in a volume of size noted along the leftmost column of Table A:

TABLE A

| Cu. In. Vol. | 16 Gauge | 14 Gauge | 12 Gauge |
|---|---|---|---|
| 7.5 | 4 | 3 | 3 |
| 10.0 | 5 | 5 | 4 |
| 12.5 | 7 | 6 | 5 |
| 15.0 | 8 | 7 | 6 |

The volume of space required for each conductor of a particular gauge is noted in Table B to thereby provide a different perspective of the data contained in Table A:

TABLE B

| Conductor Size | Free Space/Conductor |
|---|---|
| 16 | 1.75 cu. in. |
| 14 | 2.0 cu. in. |
| 12 | 2.25 cu. In. |

Using this data, the specific dimensions of box 101 can be determined, once the size of power outlet 121 and telephone jack 122 are determined. In addition, there should be sufficient clearance between the edges of power outlet 121 and telephone jack 122 and the sides of box 101 for safety and to provide a subscriber with sufficient working room to effect the equipping and installation of the device box for wall mounted communication equipment 100.

Alternate Embodiment

FIG. 5 illustrates a top plan view of an alternate embodiment of the present device box for wall mounted communication equipment 100 and FIG. 6 illustrates a top plan view of a cover plate that can be used with the alternate embodiment of the present device box for wall mounted communication equipment. In this embodiment, the box 101 is capped by a substantially flat cover plate 600, which is equipped with two apertures 601, 602 to enable the transformer conductor cable 607 and the telephone line 608 to exit the interior space of box 101. In addition, cover plate 600 is equipped with mounting pins 603, 604 that project away from cover plate 600 and fastener holes 605, 606 to enable cover plate 600 to be fastened to box 101 via fasteners 611, 612.

SUMMARY

The device box for wall mounted communication equipment comprises a box of sufficient size to receive: electrical conductors, which are terminated on an electrical outlet contained within the box; communications conductors which are terminated on a telephone jack; space to receive a transformer to interconnect the wireless telephone station set with the electrical outlet; and features that serve to mount the wireless telephone station set to the device box for wall mounted communication equipment. This enables a subscriber to mount wall mounted communication equipment flush with a wall surface, covering the power cord and its connection to a power outlet.

What is claimed:

1. A device box for providing connections for electrical conductors and communications conductors as well as to receive a power transformer, comprising:

a box open on one side for providing a housing through which is formed at least one aperture to receive electrical conductors and communications conductors;

an outlet carrying plate including an electrical outlet and a telephone jack and connectable to said electrical conductors and said communications conductors, respectively;

upper tabs, projecting from at least two walls of an interior of said box and located proximate said open side;

mounting tabs, projecting from said at least two walls of said interior of said box and located recessed from said open side of said box, for supporting said outlet carrying plate in said box at a predetermined fixed position between said open side and a back of said box to divide said box into two sections; and wherein said mounting tabs are formed at locations so that the outlet carrying plate can be inserted into said box and placed on said mounting tabs by angling said outlet carrying plate to clear said upper tabs.

2. The device box of claim 1 further comprising:

device mounting means located proximate said open side to enable mounting of a communications apparatus to said device box.

3. The device box of claim 1 wherein said outlet carrying plate comprises:

at least two apertures formed therein to correspond to positions of said mounting tabs to onable fasteners to be inserted through said apertures to secure said outlet carrying plate to said mounting tabs.

4. The device box of claim 1 further comprising:

barrier means affixed to said back of said box and positioned to partition an interior space of said box located below said outlet carrying plate into two volumes, separated from each other.

5. The device box of claim 1 further comprising:

a cover plate affixable to said upper tabs to substantially cover said open side of said box.

6. The device box of claim 5 wherein said cover plate comprises:

device mounting means (603, 604) projecting from a surface of said cover plate (600) in a direction away from said open side for enabling the mounting of a communications apparatus to said device box.

7. The device box of claim 5 wherein said cover plate comprises:

apertures formed in said cover plate to correspond to positions of said upper tabs to enable fasteners to be inserted through said apertures to secure said cover plate to said upper tabs.

* * * * *